(12) United States Patent
Yuan et al.

(10) Patent No.: US 12,132,677 B2
(45) Date of Patent: Oct. 29, 2024

(54) MULTI-PILOT REFERENCE SIGNALS

(71) Applicant: ZTE Corporation, Guangdong (CN)

(72) Inventors: Zhifeng Yuan, Guangdong (CN);
Yuzhou Hu, Guangdong (CN); Weimin Li, Guangdong (CN); Yihua Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 234 days.

(21) Appl. No.: 17/471,796

(22) Filed: Sep. 10, 2021

(65) Prior Publication Data

US 2022/0052818 A1 Feb. 17, 2022

Related U.S. Application Data

(63) Continuation of application No. PCT/CN2019/078035, filed on Mar. 13, 2019.

(51) Int. Cl.
*H04L 5/00* (2006.01)
*H04L 27/26* (2006.01)

(52) U.S. Cl.
CPC ........ *H04L 5/0051* (2013.01); *H04L 27/2613* (2013.01); *H04L 27/26132* (2021.01)

(58) Field of Classification Search
CPC .............. H04L 5/0051; H04L 27/2613; H04L 27/26132
See application file for complete search history.

(56) References Cited

U.S. PATENT DOCUMENTS

| | | | |
|---|---|---|---|
| 7,826,370 B1 | 11/2010 | Vargantwar et al. | |
| 8,059,542 B1 | 11/2011 | Oroskar et al. | |
| 11,063,716 B2 | 7/2021 | Kim et al. | |
| 11,272,533 B2 | 3/2022 | Cao et al. | |
| 2005/0229075 A1 | 10/2005 | Berkmann et al. | |
| 2006/0093146 A1* | 5/2006 | Ungerboeck | H04L 25/03866 380/268 |
| 2011/0243075 A1 | 10/2011 | Luo et al. | |
| 2015/0296359 A1 | 10/2015 | Edge | |
| 2016/0234787 A1 | 8/2016 | Liu | |
| 2017/0034829 A1 | 2/2017 | Yang et al. | |
| 2017/0126348 A1 | 5/2017 | Pourahmadi et al. | |
| 2018/0262308 A1 | 9/2018 | Si et al. | |

(Continued)

FOREIGN PATENT DOCUMENTS

| | | |
|---|---|---|
| CN | 101938296 A | 1/2011 |
| CN | 104812057 A | 7/2015 |

(Continued)

OTHER PUBLICATIONS

CATT R1-1707463 On NR RACH Preamble design May 2017 (Year: 2017).*

(Continued)

*Primary Examiner* — Rina C Pancholi
(74) *Attorney, Agent, or Firm* — Perkins Coie LLP

(57) ABSTRACT

Disclosed are methods, apparatuses, systems, and computer readable media. In one aspect, a wireless communication method is disclosed. The method includes generating, at a first radio terminal, a signal comprising a pilot signal, wherein the pilot signal includes W pilot sequences, wherein W is an integer, and wherein the W pilot sequences are uncorrelated; and transmitting, from the first radio terminal to a second radio terminal, the signal.

20 Claims, 15 Drawing Sheets

(56) References Cited

U.S. PATENT DOCUMENTS

| | | | | |
|---|---|---|---|---|
| 2018/0302889 A1* | 10/2018 | Guo | ............... | H04W 72/046 |
| 2019/0132723 A1* | 5/2019 | Sorrentino | ........ | H04W 72/0446 |
| 2019/0132882 A1* | 5/2019 | Li | ............... | H04W 74/0833 |
| 2019/0260628 A1* | 8/2019 | Lin | ............... | H04L 27/2613 |

FOREIGN PATENT DOCUMENTS

| | | |
|---|---|---|
| CN | 104955164 A | 9/2015 |
| CN | 106506133 A | 3/2017 |
| WO | 2014140251 A1 | 9/2014 |
| WO | 2016191967 A1 | 12/2016 |
| WO | 2017/167366 A1 | 10/2017 |
| WO | 2018161864 A1 | 9/2018 |
| WO | 2019031856 A1 | 2/2019 |
| WO | 2020034609 | 2/2020 |

OTHER PUBLICATIONS

International Search Report and Written Opinion mailed on Nov. 28, 2019 for International Application No. PCT/CN2019/078035, filed on Mar. 13, 2019 (6 pages).
Chinese Office Action issued in CN Patent Application No. 201980093998.5, dated Jan. 10, 2023, 14 pages. English translation included.
Chinese Office Action issued in CN Patent Application No. 201980093998.5, dated Jun. 6, 2022, 15 pages. English translation included.
European Search Report for EP Patent Application No. 19919017.4, dated May 30, 2022, 15 pages.
Partial European Search Report for EP Patent Application No. 19919017.4, dated Feb. 24, 2022, 15 pages.
Mostafa, et al., "Aggregate Preamble Sequence Design for Massive Machine-Type Communications in 5G Networks," 2018 IEEE Global Communications Conference (Globecom), IEEE, Dec. 9, 2018, XP033520120, 6 pages.
Chung, et al., "Preamble Sequence Design for Spectral Compactness and Initial Synchronization in OFDM," IEEE Transactions on Vehicular Technology, vol. 67, No. 2, Feb. 2018, 16 pages.
ZTE, "Multi-user advanced receivers for NOMA, " 3GPP TSG RAN WG1 Meeting #94, R1-1809858, Gothenburg, Sweden, Aug. 20-24, 2018, 28 pages.
CATT, "NR RACH Preamble Format for capacity enhancement," 3GPP TSG RAN WG1 Meeting #90, R1-1712357, Prague, Czechia, Aug. 21-25, 2017, 29 pages.
CATT, "On NR RACH Preamble Design," 3GPP TSG RAN WG1 Meeting #89, R1-1707463, Hangzhou, P.R. China, May 15-19, 2017, 26 pages.
ZTE, et al., "Further Consideration on the Preamble Design for Grant-free Non-orthogonal MA," 3GPP TSG RAN WG1 Meeting #87, R1-1611500, Reno, USA, Nov. 14-18, 2016, 7 pages.
Texas Instruments, "A new preamble shape for the Random Access preamble in E-UTRA," 3GPP TSG RAN WG1 #44-bis, R1-060867, Athens, Greece, Mar. 27-31, 2006, 5 pages.
Fatang et al., "An implementation design of preamble detection based on LTE random access," Study on Optical Communications, Issue 3, Jun. 10, 2011, 3 pages, English abstract included.
ETRI, "Considerations on Pilot Design for D2D Communications," 3GPP TSG RAN WG1 #74, R1-133185, Barcelona, Spain, Aug. 19-23, 2013, 4 pages.
Chinese Notification to Complete Formalities of Registration issued in CN Patent Application No. 201980093998.5, dated May 19, 2023, 9 pages. English translation included.
NTT DOCOMO, Inc., "Study on New Radio Access Technology," 3GPP TSG RAN meeting #75, RP-170376, Dubrovnik, Croatia, Mar. 6-9, 2017, 157 pages.
Samsung et al., "WF on RACH preamble format," 3GPP TSG RAN WG1 #88, R1-1703741, Athens, Greece, Feb. 13-17, 2017, Agenda item: 8.1.1.4.1, 3 pages.
Sequans, "Considerations for sequence based PUCCH in short-duration," 3GPP TSG RAN WG1 Meeting #88bis, R1-1705878, Spokane, USA, Apr. 3-7, 2017, 3 pages.
Itri, "Considerations and Evaluation on SS Sequence Design for New Radio," 3GPP TSG RAN WG1 NR Ad-Hoc#2, R1-1710975, Qingdao, P.R. China, Jun. 27-30, 2017, 7 pages.
Samsung, "PRACH preamble format details for capacity enhancement and beam management," 3GPP TSG RAN WG1 #90, R1-1713560, Prague, Czech, Aug. 21-25, 2017, 4 pages.
Intel Corporation et al., "WF on NB-PBCH Rate Matching and RE Mapping," 3GPP TSG RAN WG1 Meeting #84, R1-161434, St Julian's, Malta, Feb. 15-19, 2016, 4 pages.
3GPP tsg_ran\WG1_RL1, "TDoc_List_Meeting_RAN 1#66," Jan. 11, 2018, 174 pages.
3GPP TS 51.010-3 V6.1.0 (Feb. 2005), Technical Specification, 3rd Generation Partnership Project; Technical Specification Group GSM/EDGE Radio Access Network; Mobile Station (MS) conformance specification; Part 3: Layer 3 (L3) Abstract Test Suite (ATS) (Release 6), 79 pages.
Indonesian Notification on Substantive Examination Result issued in ID Patent Application No. P00202108631, dated Jan. 18, 2024, 8 pages. English translation included.

* cited by examiner

MULTI-PILOT REFERENCE SIGNALS

CROSS-REFERENCE TO RELATED APPLICATIONS

This application is a continuation of International Patent Application No. PCT/CN2019/078035, filed on Mar. 13, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Apparatuses, methods, systems, and computer readable media are disclosed. In one aspect, a wireless communication method is disclosed. The method includes generating, at a first radio terminal, a signal comprising a pilot signal, wherein the pilot signal includes W pilot sequences, wherein W is an integer, and wherein the W pilot sequences are uncorrelated; and transmitting, from the first radio terminal to a second radio terminal, the signal.

In another aspect, another wireless communication method is disclosed. The method includes receiving, at a second radio terminal from a first radio terminal, a signal including a plurality of pilot signals and payload information; and detecting, at the second radio terminal, the signal including the plurality of pilot signals, wherein the plurality of pilot signals includes W pilot sequences, wherein W is an integer, and wherein the W pilot sequences are uncorrelated.

The following features can be included in various combinations. Each of the W pilot sequences in the pilot signal is selected or determined independently from a predetermined pool of pilot sequences. Each of the W pilot sequences in the pilot signal is generated independently by a sequence generator. The W pilot sequences are selected or determined independently from a plurality of predetermined pools of pilot sequences. The pool of predetermined pilot sequences includes one or more of: a PRACH preamble sequence pool of a long-term evolution (LTE) standard, or another PRACH preamble sequence pool of a new radio (NR) standard. The pool of predetermined pilot sequences is a demodulation reference signal (DMRS) sequence pool of a long-term evolution (LTE)standard or a new radio (NR) standard, or the pool of predetermined pilot sequences is a DMRS ports pool of the LTE standard or the NR standard. The W pilot sequences are selected or determined independently from two or more different predetermined pools of pilot sequences. The two or more different predetermined pools of pilot sequences include two or more of: a PRACH preamble sequence pool of a long-term evolution (LTE) standard, another PRACH preamble sequence pool of a new radio (NR) standard, a DMRS sequence pool of the LTE standard, another DMRS sequence pool of the NR standard, a DMRS port pool of the LTE standard, or another DMRS port pool of the NR standard. The W pilot sequences are uncorrelated preamble sequences. The W pilot sequences are uncorrelated LTE standard PRACH preamble sequences, or NR standard PRACH preamble sequences. The W pilot sequences are uncorrelated DMRS sequences or uncorrelated DMRS ports. The W pilot sequences are uncorrelated LTE standard DMRS sequences, uncorrelated LTE standard DMRS ports, uncorrelated NR standard DMRS sequences, or uncorrelated NR standard DMRS ports. The W pilot sequences are uncorrelated Zadoff-Chu sequences. The W uncorrelated Zadoff-Chu sequences have uncorrelated cyclic shift values. The W pilot sequences are uncorrelated pseudo-noise sequences. The W pilot sequences are uncorrelated maximum length shift register (MLSR) sequences. The W uncorrelated maximum length shift register (MLSR) sequences are W MLSR sequences determined by W uncorrelated initial states. The W pilot sequences are uncorrelated Gold sequences. The W pilot sequences are uncorrelated Discrete Fourier Transform (DFT) sequences or Walsh-Hadamard sequences. The signal further comprises a payload, and wherein the W pilot sequences are determined from a portion of the payload. The W pilot sequences are determined by a quantity of bits of the payload wherein the quantity of bits is equal to W times M, wherein M is an integer, and wherein $2^M$ is the cardinality of the predetermined pool of pilot sequences. The payload contains an identification of the first radio terminal, and the W pilot sequences are determined from at least a portion of the identification of the first radio terminal. The bits of the payload are generated using a partial scrambling technique, wherein bits of the payload before a partial scrambling are divided into two parts, then a first part of bits do not change and a second part of bits are scrambled by a scrambling sequence determined by the first part of bits. Payload symbols are modulated using binary phase shift keying (BPSK), π/2-BPSK, or quadrature phase shift keying (QPSK). Payload symbols are generated using a symbol spreading technique. W, may take the value 2, or 3, or 4 (W=2 or 3 or 4). Two uncorrelated pilot sequences consist of a preamble sequence and a DMRS, and the preamble sequence and the DMRS are uncorrelated. The first radio terminal is one of a user equipment, a user terminal, a wireless device, or a terrestrial device for satellite/fire balloon/unmanned aerial vehicle (UAV) communication, and the second radio terminal is one of a base station of a wireless network, or a transceiver on a satellite/fire balloon/UAV. The first radio terminal is a radio transmitter in a vehicle of a V2V wireless network and the second radio terminal is a radio receiver in another vehicle of a V2V wireless network.

The above and other aspects and their implementations are described in greater detail in the drawings, the descriptions, and the claims.

DETAILED DESCRIPTION

Grant-free transmission or unscheduled transmission refers to a transmission from/to user/terminal/device that does not need to be granted or have arranged a transmission resource (or transmission signature) via a base station (or other control node) every time the device transmits a signal; or the device may determine the transmission resource (or transmission signature) to transmit the signal. A transmission resource (or transmission signature) is determined by the device and then the data is transmitted through the autonomously determined transmission resource.

Usually, the system defines one or more transmission resource or signature pools or sets, and each transmission signature set contains a number of signatures. In grant-free transmissions or unscheduled transmissions, the user may determine or select the transmission signatures from one or more transmission signature sets.

Transmission resources or signatures include three categories including: 1) Transmission time-frequency position; 2) Reference signals\pilot signals including preamble, and/ order modulation reference signals (DMRS); and 3) Spreading codes, sparse spreading codes, scrambling codes, interleavers, etc. used in generation of signals that are transmitted. For example, if the data transmission process includes a symbol spreading process, the transmission resource (or transmission signature) includes a spreading code/spreading sequence. Moreover, if the data transmission process includes a bit scrambling or a symbol scrambling process, the transmission resource (or transmission signature) includes a bit scrambling code or a symbol scrambling code.

Different signatures used by a transmission per user can have a certain mapping relationship. For example, if the size of the pilot/RS pool is the same as the size of the spreading sequence pool, one-to-one mapping can be used. Specifically, if the user selects the nth pilot, the nth spreading sequence is selected, or the f(n) spreading sequence is selected as well, where f(n) is a permutation function of n.

If the size of the pilot pool is G times the size of the spreading sequence pool, then the mapping of G-to-one can be performed. The detail of the mapping of G-to-one is as follows: assuming the size of the spreading sequence pool is SN, thus the size of the pilot pool is G*SN, then the pilot pool can be divided into SN groups each with G pilots. The mapping of G-to-one means that each of the SN groups of pilots corresponds to a spreading sequence, that is, if any one of G pilots from the nth group is selected, the nth spreading sequence is selected, or the f(n) spreading sequence is selected as well, where f(n) is a permutation function of n.

Figure 1:
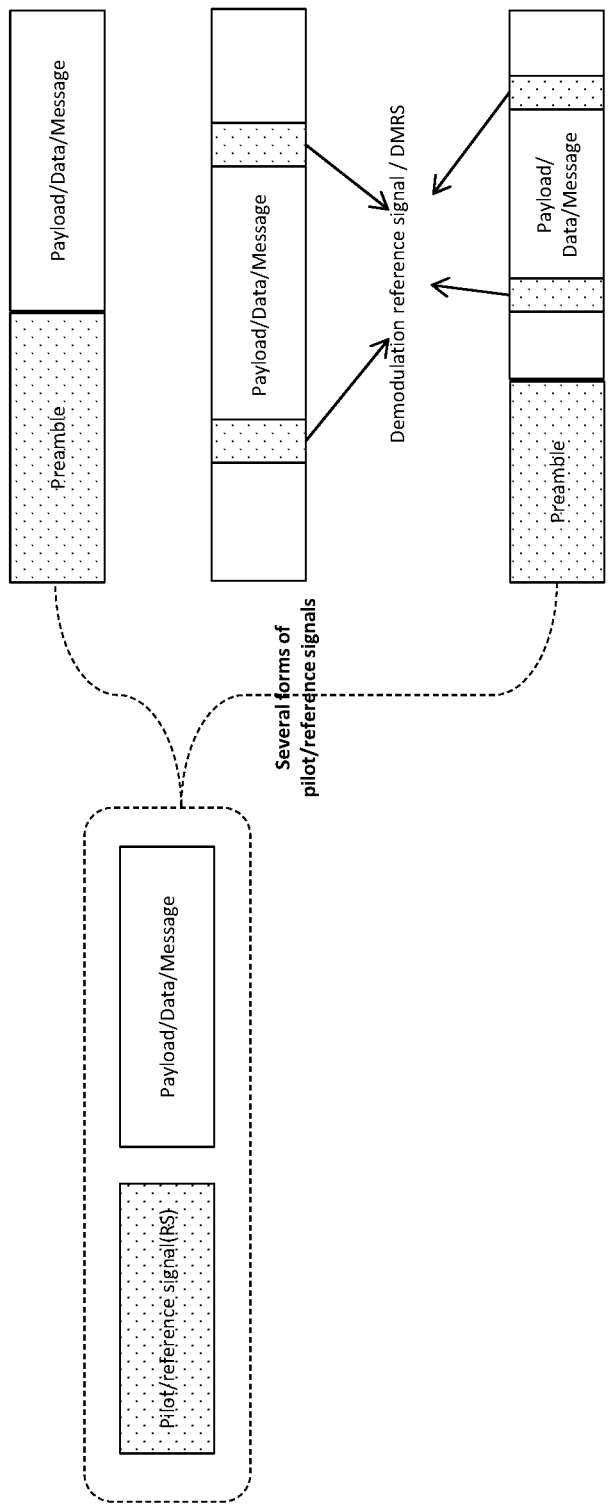
FIG. 1 depicts an example of a one-time unscheduled transmission that includes a pilot signal/reference signal, and a data symbol/message symbol, in accordance with some example embodiments.

A grant-free transmission may include a pilot signal/reference signal, and a payload including some data symbols/message symbols, as shown in FIG. 1.

A receiver for grant-free transmission (for example, a base station or a receiver of a vehicle-to-vehicle (V2V) network that receives other vehicles' information) can start multi-user detection after receiving signals from a plurality of grant-free accessing users. However, since the receiver does not know which users are accessing or activated, and which transmission signatures are used by these active users in advance, some level of blind detection may be used. Blind detection may include:

1) Active user detection (AUD) according to the detection of the pilot signal/reference signal included in the transmission, that is after the detecting of the pilot signal/reference signal included in the transmission, the receiver would know which users are accessing in this transmission, and what transmission signatures are used by these users respectively;

2) Each active user's reference signal/pilot signal is used to estimate the channel of each user separately;

3) Multi-user detection to separate the active users' payload/data is performed based on the transmission signatures and the estimated channels of the active users.

For example, if the payload/data symbols transmitted by each user are generated by procedures including the symbol spreading technique, that is, each modulation symbol is spread to L symbols by a spreading sequence of length L, then the transmission signatures also include the spreading sequence.

If the payload/data bits transmitted by each user are generated by procedures including bit scrambling, or if the transmitted data symbols are generated by procedures including symbol scrambling, that is, the data bits or modulation symbols are scrambled by the scrambling sequence, then the transmission signatures also include the scrambling sequence.

If the data bits transmitted by each user are generated by procedures including bit interleaving, or the transmitted data symbols are generated by procedures including symbol interleaving, that is, the data bits or modulation symbols are interleaved by the interleaver, the transmission signatures also include an interleaver.

In some example embodiments, transmission signals may be generated by symbol spreading techniques. For example, each user equipment (UE) or vehicle spreads its digital modulation information symbols, such as BPSK/QPSK symbols, using an L-length spreading code or spreading sequence$\{c_k\}$. Let K denote the number of simultaneously active UEs accessing to the base station (BS) or vehicles around a given vehicle (in an interesting range around a given vehicle). In an example scenario, if all the UEs/vehicles deployed a single transmit (TX) antenna and BS or the receiving vehicle deploys a single receive (RX) antenna, the digital received signal vector $y \in \mathbb{C}^L$, where L is the number of frequency or time domain resource elements (REs)spanned by the L-length spreading vector and carry the same digital modulation symbols, at the receiver can be written as follows:

$$y = \sum_{k=1}^{K} c_k \odot h_k s_k + w \qquad \text{Equation 1}$$

where $h_k$ is the channel vector between the transmit antenna of the k-th UE/vehicle and the receive antenna of the BS or the given vehicle, $s_k$ is the digital modulation symbol of the message of the k-th UE/vehicle, and the operator $\odot$ indicates the pointwise multiplication or product of two vectors. The L-length spreading code/spreading sequence$\{c_k\}$ may also acts as the transmit signature (signature vector).

If multiple RX antennas are used in the BS or the given receiving vehicle, the digital received signal corresponding to a single digital modulation symbol can be formed by concatenating the L-length received vector y from each RX antenna. For example, if Nr RX antennas are deployed in the BS or the given receiving vehicle, the Nr*L digital received signal vector corresponding to a single digital modulation symbol can be formed by concatenating the Nr L-length received vectors from each of the RX antennas.

In some embodiments, the transmit signal generator generates signals without using symbol spreading techniques. In the context of symbol spreading, without symbol spreading can also be regarded as spreading symbols using the degenerate one-length spreading code $\{1\}$. With this degenerate one-length spreading code$\{c_k\}=\{1\}$, the digital received signal vector corresponding to the symbol without spreading can also be expressed as:

$$y = \sum_{k=1}^{K} c_k \odot h_k s_k + w \qquad \text{Equation 2}$$

Through the correlation detection of the pilot signal or reference signal, the receiver detects that the correlation peak of K pilot signals is greater than the detection threshold, then the receiver will consider that there are K users accessing or activated in this transmission.

Further, through the K detected pilot signals/reference signals, the channel $\{h_k\}$ of the K users can be estimated. Furthermore, through the mapping relationship between the pilot signal/reference signal and the spreading sequence, the spreading sequence $\{c_k\}$ used by the K users can be determined.

After obtaining this information, the receiver can perform multi-user data detection (MUD) to separate the active users' payload/data. For example, minimum mean square error (MMSE) detection based successive interference cancellation (SIC), e.g., MMSE-SIC, can be used for multi-user detection.

In order to ensure orthogonal scheduling of user access, an orthogonal system may require a strict access procedure. Access procedures occur less frequently for some scenarios, such as massive machine type communications (mMTC), sporadic packets, vehicle networks, and their energy efficiency and spectral efficiency. Grant-free transmissions, which may increase receiver complexity, can be exchanged for a lean transmission process, thereby saving signaling, delay, power consumption, and the advantages are obvious. This can be used in at least three typical scenarios in 5G including mMTC, enhanced mobile broadband (eMBB), and ultra-reliable low latency communications (uRLLC). For example, for mMTC, a base station for a large number of low-cost low-power terminals; for eMBB a background packet and scheduling-free transmission can save terminal battery use; and for uRLLC V2V uses low latency, high reliability, and no scheduling.

For grant-free transmissions, each user equipment may determine or select the transmission signature autonomously and therefore the transmission signature may be unrelated and independent of other user equipment. The transmission signature may be selected form a transmission signature set which may be a set of finite size. When multiple users select a transmission signature autonomously, two or more users may select the same transmission signature, resulting in a transmission signature collision.

The traditional transmission frame structure including pilot/reference signal and payload data, shown in FIG. 1, can be used to reduce the complexity of the blind detection by taking advantage of the pilot/reference signal. However, once a pilot or reference signal collision occurs, that is, two or more users select the same pilot or reference signal, the MUD receiver may at most detect the strongest user's signal if the powers of the two colliding users are very disparate (the so-called near-far effect). On the other hand, if the power of the two undetected colliding users is comparable, it is possible that neither of them can be separate. Further, if the two undetecting collided users are two relatively strong users among the K users accessing at the same resource, the detection of the relatively weak users are severe affected, To reduce the possibility of preamble collision in a grant-free transmission scheme including a preamble and payload/data, the size of the preamble pool or set should be increased. However, as the number of preambles in the pool increases, generally the length of the preamble increases. This causes the preamble to occupy more time-frequency resources and increases the overhead. When the transmission time-frequency resources are fixed, with the preamble overhead increased, the available resources for the payload/data portion are reduced, which may result in demodulation performance degradation of the data. Moreover, as the number of preambles increases, the length of the preamble also increases, thus the blind detection complexity of the preamble required for user activation detection increases asymptotically in a square relationship of the number of preambles, which increases the difficulty of implementation.

Figure 2:
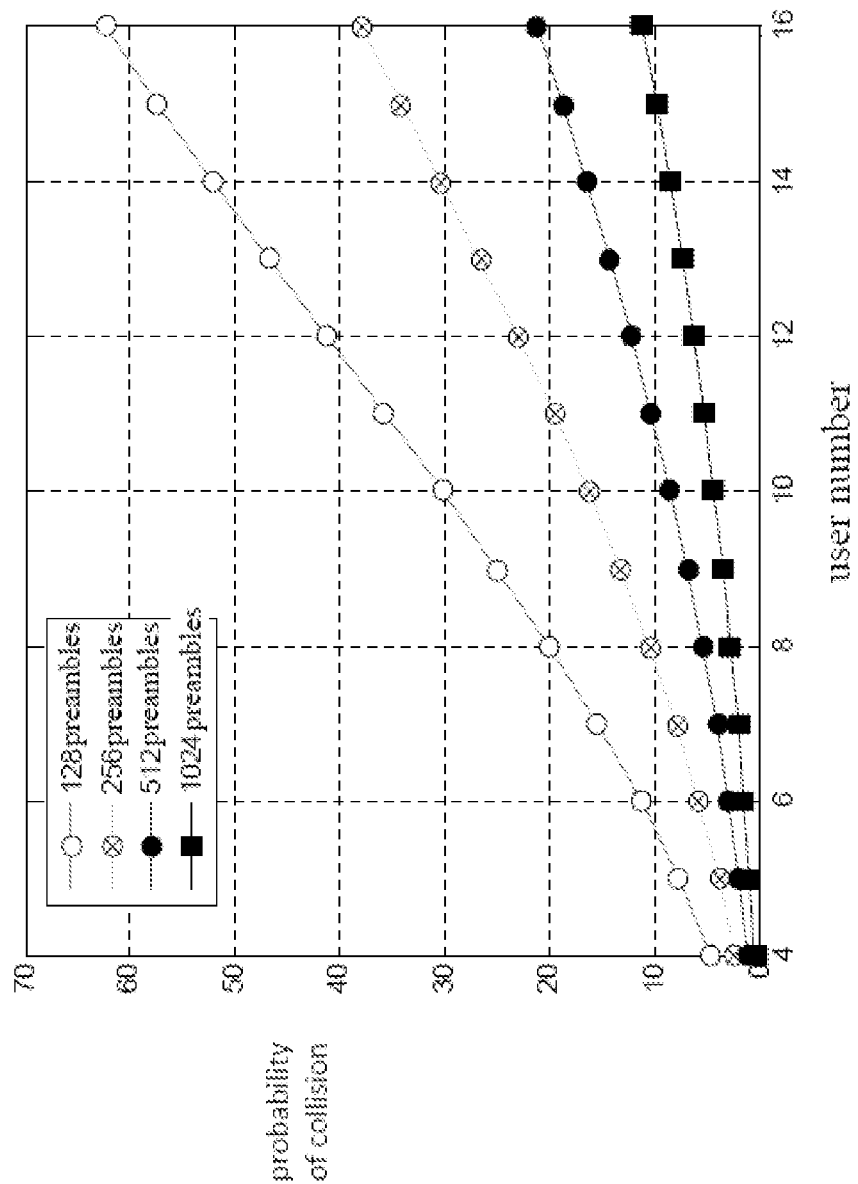
FIG. 2 depicts a chart showing an example of as the number of users increases, the collision probability of the preamble rises rapidly, in accordance with some example embodiments.

Further, as shown in FIG. 2, as the number of active users increases, the collision probability of the preamble rises rapidly. Or, as the number of active users increases, the number of preambles needs to increase significantly to ensure that the collision rate maintain an acceptable level.

For example, if 6 users randomly select preambles with a desired probability of preamble collision of less than 10%, then 128 preambles will barely satisfy the desired probability of collision. However, with a slight increase in the number of users from 6 to 8, the probability of collision using 128 preambles rises to 20%.

For 8 users to randomly choose preambles with a desired collision probability of less than 10%, a preamble pool including 256 preambles is required. However, the overhead and detection complexity associated with 256 preambles is much greater than that with 128 preambles.

For 10 users, 512 preambles are needed to make the preamble collision probability less than 10%.

As the number of users increases slowly the number of needed preambles to ensure a acceptably low collision probability increases rapidly, resulting in an increase in the overhead and detection complexity associated with the preambles.

In traditional transmissions, usually just one pilot sequence or reference sequence is contained in each transmission. This type of traditional pilot/reference signal scheme can be regarded as single-pilot/single-RS scheme.

In some traditional transmissions, a transmission contains w preamble sequences [P1, P2], but the two preambles are repeated, i.e., P1=P2=P. Similarly, if the first preamble sequence is determined, the second preamble sequence is determined as well. As a result, the second preamble sequence is dependent on/correlated with the first preamble sequence. Such a preamble scheme can be used for time-frequency offset estimation.

Alternatively, the transmission may include two preamble sequences [P1, P2], but [P1, P2] is formed by a preamble sequence P by orthogonal cover code (OCC) weighting, that is, P1=P, P2=P, or P1=P, P2=−P, the UE randomly selects the preamble sequence P and the OCC code. In another word, if the first preamble sequence and the OCC weight are determined, the second preamble sequence is determined as well. Alternatively, the second preamble sequence is determined from the first preamble sequence and the OCC weight. As a result, the second preamble sequence is dependent on/correlated with the first preamble sequence.

Alternatively, the transmission may contain 2 preambles [P1, P2], where [P1, P2] is formed by a preamble sequence P by another weighting, that is, P1=αP, P2=βP, where α, β are weighted values, and [α, β] can be regarded as weight sequence. For example, the above OCC weighting may be a special case of [α, β]=[1,1] or [1, −1]. Such a preamble scheme can further increase the number of preambles but may destroy the orthogonality of the preamble. In another word, if the first preamble sequence and the weight sequence are determined, the second preamble sequence is determined as well. Alternatively, the second preamble sequence is determined from the first preamble sequence and the weight sequence. As a result, the second preamble sequence is dependent on/correlated with the first preamble sequence.

Similarly, for DMRS, the transmission includes one DMRS, or multiple associated DMRSs. For example, two DMRSs [P1, P2], but the two DMRSs are simply repeated by a DMRS sequence, that is, P1=P2=P. Or the two DMRSs may be formed by a DMRS sequence weighted by OCC, that is, P1=P2=P, or P1=P, P2=−P. Or the two DMRSs may be formed by a DMRS sequence by another weighting, that is, P1=αP, P2=βP, where α, β are weighted values, and [α, β] can be regarded as weight sequence, for example, OCC weighting is [α, β]=[1, 1] or [1, −1]. As a result, the second DMRS sequence is dependent on/correlated with the first DMRS sequence.

Some schemes will have both a preamble and DMRS. Moreover, there is a determined relation between the preamble and the DMRS: once the preamble is determined, the corresponding DMRS is determined as well.

The pilot or reference signal in a conventional scheme can be regarded as a single-pilot/RS scheme or correlated multi-pilot/RS scheme. These conventional pilot/reference signal scheme suffers a higher probability of collision in grant-free transmissions.

Figure 3:
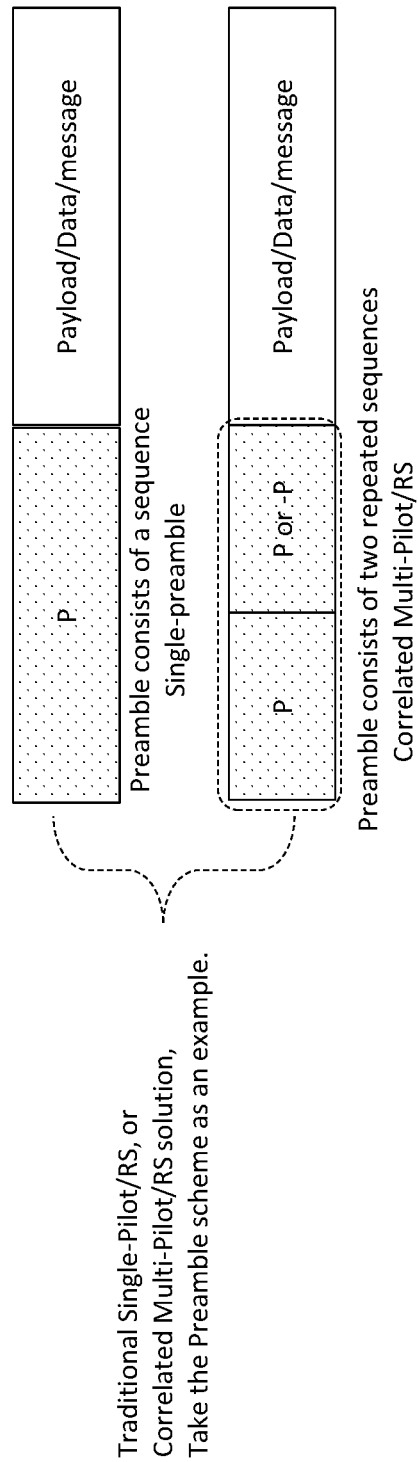
FIG. 3 depicts an example of a single preamble pilot and payload data, and a preamble including two pilots and payload data, in accordance with some example embodiments.

FIG. 3 depicts an example of a preamble including one preamble sequence and payload/data, and a preamble including two correlated preamble sequences and payload/data.

Figure 4:
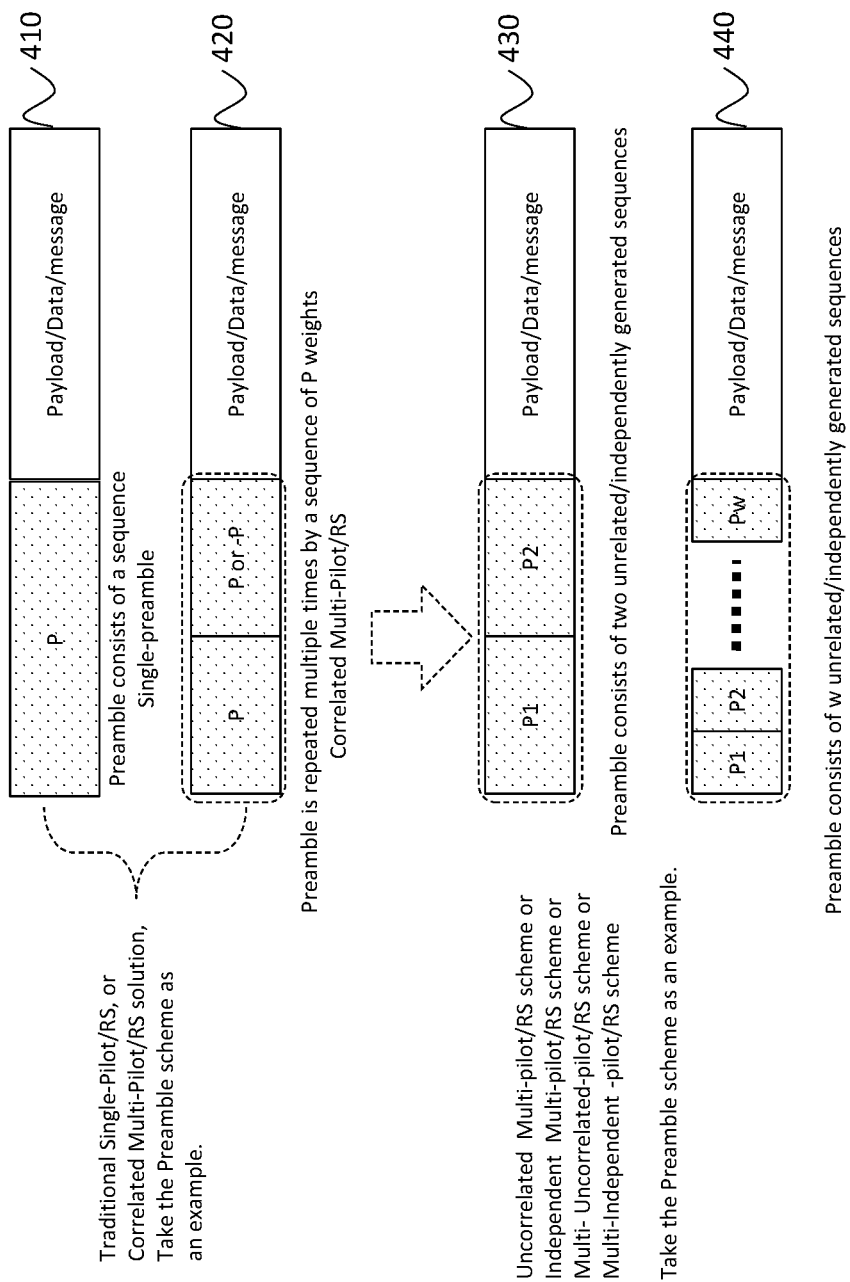
FIG. 4 depicts example data messages with associated preambles, in accordance with some example embodiments.

FIG. 4 depicts the comparison of traditional correlated pilot/RS scheme with the uncorrelated multi-pilot/multi-RS scheme. The upper portion above the arrow, 410, 420, is actually a copy of FIG. 3 and portion below the arrow, 430 and 440, is uncorrelated multi-pilot/multi-RS scheme. Shown at 410 is a data packet with a preamble that includes a single sequence. Shown at 420 is a transmission with a preamble consisting of two repeated preamble sequences with OCC weight. Shown at 430 is a transmission with a preamble that includes two uncorrelated preamble sequences that are independently determined or generated. Shown at 440 is a transmission with a preamble that includes an integer quantity, W, of uncorrelated sequences that are independently determined or generated.

Figure 5A:
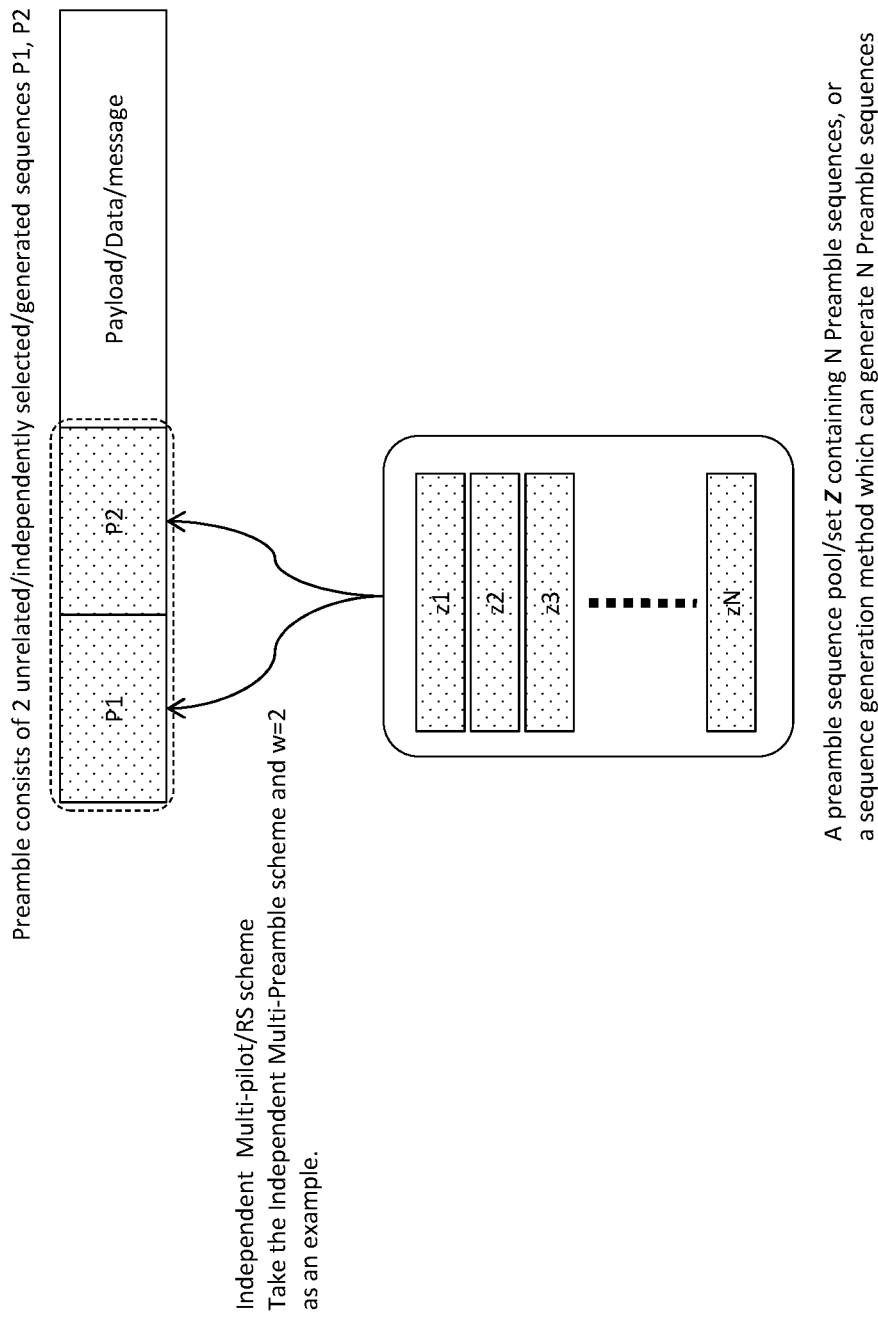
FIG. 5A depicts an example data packet with a preamble that includes uncorrelated and independently generated sequences.
Figure 5B:
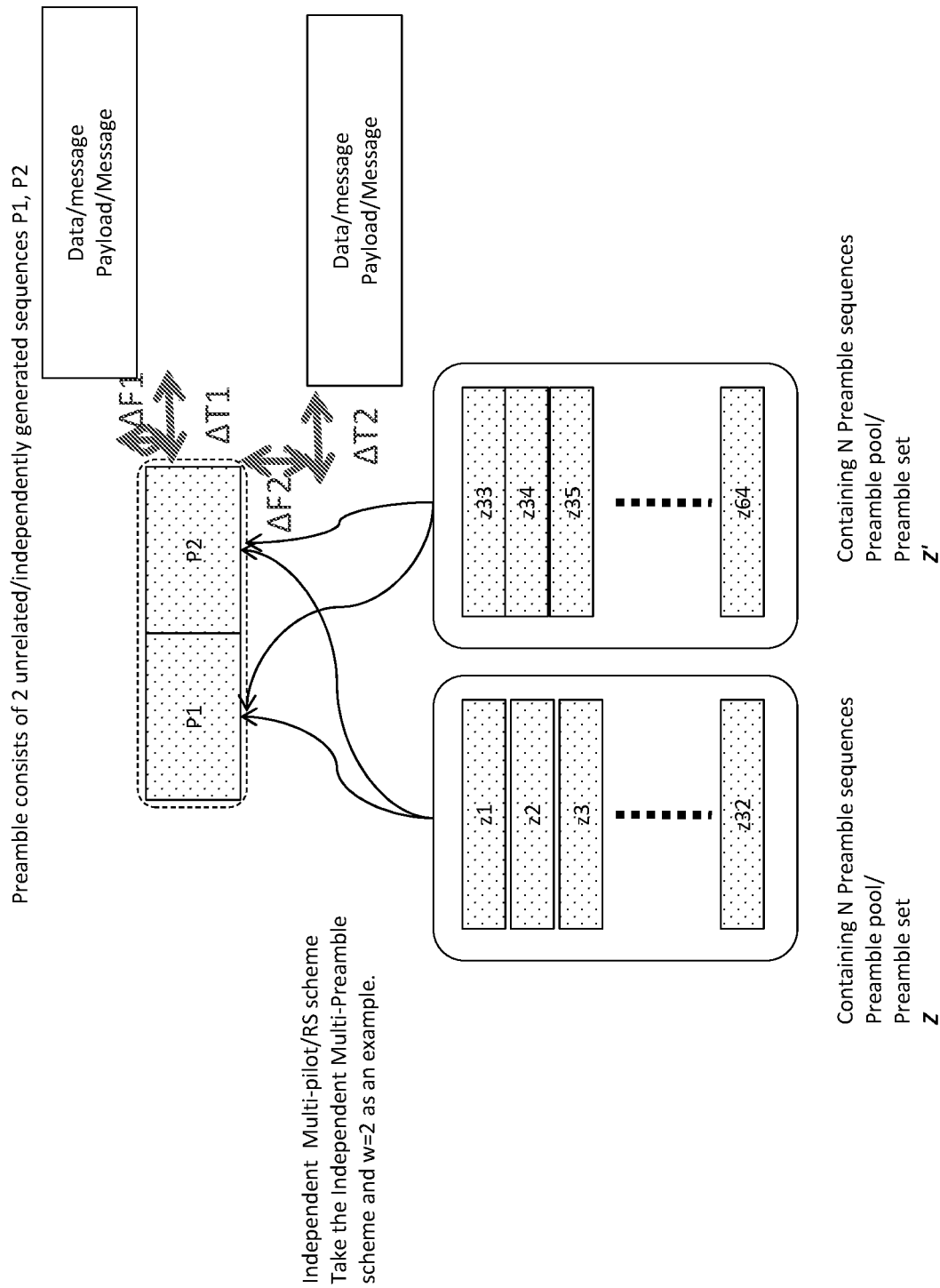
FIG. 5B depicts another example data packet with a preamble that includes uncorrelated and independently generated sequences.

FIG. 5A depicts a transmission including a preamble signal and a payload, and wherein the preamble signal contains two uncorrelated and independently generated preamble sequences. FIG. 5B is an example of uncorrelated/independent Multi-pilot scheme, taking the independent Multi-Preamble scheme and w=2 as an example.

In some example embodiments, as shown in FIG. 5A, a preamble pool or preamble set Z including a quantity, N, preamble sequences (that's the cardinality of Z is N) is defined in advance by the system, and the preamble sequences P1 and P2 including in the transmission are selected from Z independently or uncorrelated. Specifically, if N=2^M, M bits are needed to select or represent a sequence from Z. In this way, the selecting P1 from Z needs M bits, and another M bits are needed to select P2 from Z. In this example, P1 and P2 are uncorrelated or independent means that the M bits used for selecting P1 from Z and the M bits used for selecting P2 from Z are uncorrelated or independent. In some example embodiments, the cardinality of Z is 2^M, e.g. N=2^M. P1 and P2 can be determined from Z by 2M bits in the payload bits/data bits which are also codeword bits encoded through a Forward Error Correction (FEC) code. Such that once a user's payload bits/data bits are decoded correctly in the receive side, e.g. having passed the Cyclic Redundancy Check (CRC), the receiver could get the 2M bits and then know the two uncorrelated preamble sequences, P1 and P2, used by the user's transmission. For example, when N=64 (that is the cardinality of Z is 64), since 64=2^6, P1 may be determined from Z using 6 bits of the payload bits/data bits and P2 may be determined from Z using another 6 bits of the payload bits/data bits. Totally P1 and P2 can be determined from Z by 2*6=12 bits in the payload/data. In some example embodiments, the user identifier (UE_ID) is included in the payload bits/data bits. P1 and P2 can be determined by certain 2M bits of the UE_ID. For example, when the cardinality of Z, N, is 64, P1 can be determined from Z using 6 bits of the UE_ID and P2 may be determined from Z using another 6 bits of the UE_ID. By determining the P1 and P2 from 2M bits of the UE_ID or other payload bits/data bits, it is not necessary to introduce extra information indicating the uncorrelated preamble sequences in the data or payload, thereby saving overhead. In some example embodiments, introducing some extra bits to be included in the payload bits/data bits so as to indicate the uncorrelated preamble sequences, e.g. P1 and P2, is also a possible solution. However, this solution would reduce transmission efficiency by increasing the overhead associated with the uncorrelated preamble sequences thereby taking away available bits for payload data. This reduction in transmission efficiency associated with the extra information of preamble sequences could be significant when the transmission carries a small message.

In some example embodiments, FIG. 5A depicts a transmission including a preamble signal and a payload, and wherein the preamble signal contains two preamble sequences which are generated uncorrelated and independently by a sequence generation method. A sequence generation method here includes but is not limit to a sequence generation formula and a sequence generator based on shift register, such as the maximum length shift register (MLSR). In FIG. 5A, a sequence generation method which could generate a quantity, N, preamble sequences is defined in advance by the system, and the preamble sequences P1 and P2 including in the transmission are generated independently or uncorrelated by the sequence generation method. In some example embodiments, two uncorrelated Zadoff-Chu (ZC) sequences are used to constitute the preamble signal in a transmission. Then in FIG. 5A, the sequence generation method is the ZC sequence generation formula, and P1 and P2 are two uncorrelated Zadoff-Chu (ZC) sequences. Generally, a ZC sequences can be determined by setting two variables of a "root" and a "cyclic shift" in the ZC sequence formula. However, ZC sequences with different "root" are not orthogonal and would introduce difficulty into the active user detection and channel estimation associated with them. So usually ZC sequences with the same "root" are used in a cell or a V2V network. This is so that a ZC sequences can be determined by setting only a "cyclic shift" in the ZC sequence formula. Such that, N Zc sequences in FIG. 5A can be determined from a ZC sequence formula using N "cyclic shift" values. Further the two uncorrelated ZC sequences constituting the preamble signal refer that the two ZC sequences are determined from a ZC sequence formula using two uncorrelated "cyclic shift" values. Some bits in the payload codeword/data bits can be used to determine the "cyclic shift" values of P1 and P2. As the payload bits/data bits are also codeword bits encoded through a Forward Error Correction (FEC) code. Once a user's payload bits/data bits are decoded correctly in the receive side, e.g. having passed the Cyclic Redundancy Check (CRC), the receiver could get the "cyclic shift" values of P1 and P2 and then know the two uncorrelated preamble sequences, P1 and P2, used by the user's transmission. In some example embodiments, the user identifier (UE_ID) is included in the payload bits/data bits. Some bits in the UE_ID can be used to determine the "cyclic shift" values of P1 and P2. By determining the "cyclic shift" values of P1 and P2 from bits of the UE_ID or other payload bits/data bits, it is not necessary to introduce extra information indicating the se uncorrelated preamble sequences in the data or payload, thereby saving overhead.

In some example embodiments, two uncorrelated MLSR sequences are used to constitute the preamble signal in a transmission. Then in FIG. 5A, the sequence generation method is the MLSR sequence generator, and P1 and P2 are two uncorrelated MLSR sequences. Generally, a MLSR sequences can be determined by setting a "initial state" in the MLSR sequence generator. Then, N MLSR sequences in FIG. 5A can be determined from a MLSR sequence generator using N initial states. Further the two uncorrelated MLSR sequences constituting the preamble signal refer that the two MLSR sequences are determined from a ZC MLSR sequence generator using two uncorrelated initial states. Some bits in the payload codeword/data bits can be used to determine the initial states of P1 and P2. As the payload bits/data bits are also codeword bits encoded through a Forward Error Correction (FEC) code. Once a user's payload bits/data bits are decoded correctly in the receive side, e.g. having passed the Cyclic Redundancy Check (CRC), the receiver could get the initial states of P1 and P2 and then know the two uncorrelated preamble sequences, P1 and P2, used by the user's transmission. In some example embodiments, the user identifier (UE_ID) is included in the payload bits/data bits. Some bits in the UE_ID can be used to determine the initial states of P1 and P2. By determining the initial states of P1 and P2 from bits of the UE_ID or other payload bits/data bits, it is not necessary to introduce extra information indicating the se uncorrelated preamble sequences in the data or payload, thereby saving overhead.

The set Z is further mapped to a transmission resource for the payload/data, such as PUSCH resource comprising a certain time and frequency resource. The time and frequency offset of the PUSCH resource position with respect to the time and frequency position of the preamble parts are related to the preamble index within a set or the set index. FIG. 5B depicts an example where a total of 64 preambles is divided into 2 sets i.e. Z and Z' each of which consists of 32 preambles. Each set is mapped to a PUSCH resource. The DMRS signals in the PUSCH resource, if any, are generated independently from the preamble.

Figure 6:
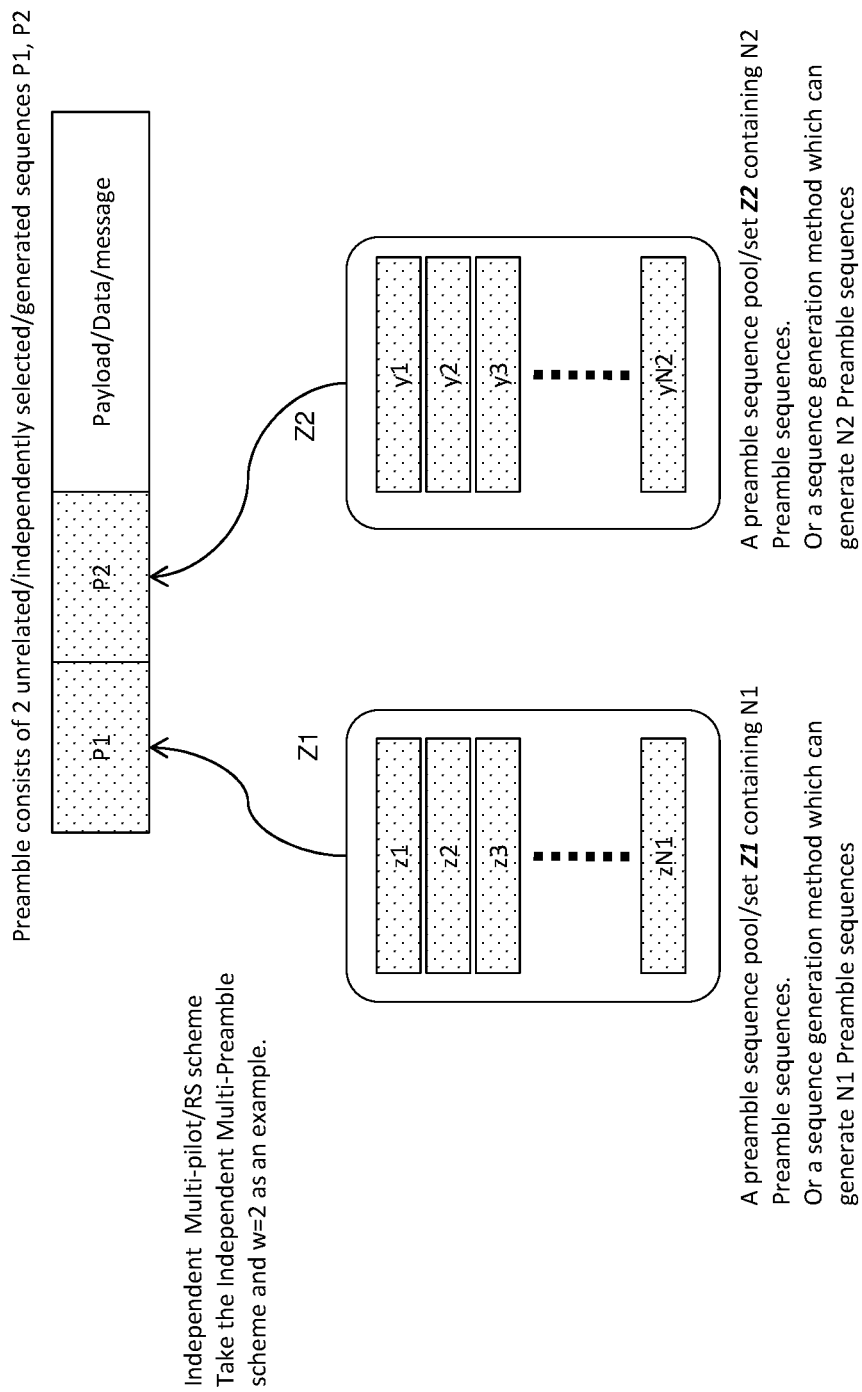
FIG. 6 depicts an example data packet with a preamble that includes two sequences, P1 and P2, in accordance with some example embodiments.

FIG. 6 depicts a data packet with a preamble that includes two sequences, P1 and P2. P1 is selected from a preamble pool or preamble set, Z1, which includes N1 preamble sequences. P2 is selected from a preamble pool or preamble set Z2, which includes N2 preamble sequences. Selecting P1 from Z1 is independent of P2 from Z2.

In another aspect related to FIG. 6, sequence generation methods are disclosed. For example, method1 may be used for generating N1 preamble sequences z1 to zN1, and Method2 may be used for generating N2 Preamble sequences y1 to yN2. P1 and P2 may be generated by these two different sequence generation methods, respectively, but the generation of P1 and P2 is independent and unrelated.

For example, a method for generating N1 preamble sequences, Method1, uses a Zadoff-Chu (ZC) sequence formula, formula1, and sequence generation method, Method2, that uses another ZC sequence formula, formula2, for generating N2 other preamble sequences. Different ZC sequences are generally generated by setting different "root" and "cyclic shift" variables in the ZC sequence formula. However, ZC sequences with different "root" are not orthogonal and would introduce difficulty into the active user detection and channel estimation associated with them. So usually ZC sequences with the same "root" are used in a cell or a V2V network. This is so that a ZC sequences can be determined by setting only a "cyclic shift" in the ZC sequence formula. Such that, N1 ZC sequences in FIG. 6 can be determined from one ZC sequence formula, formula1, using N1 "cyclic shift" values and N2 ZC sequences in FIG. 6 can be determined from another ZC sequence formula, formula2, using N2 "cyclic shift" values. Further the two uncorrelated ZC sequences, P1 and P2, constituting the preamble signal refer that the two ZC sequences are determined from the two ZC sequence formulas using two uncorrelated "cyclic shift" values. Some bits in the payload codeword/data bits can be used to determine the "cyclic shift" values of P1 and P2. As the payload bits/data bits are also codeword bits encoded through a Forward Error Correction (FEC) code. Once a user's payload bits/data bits are decoded correctly in the receive side, e.g. having passed the Cyclic Redundancy Check (CRC), the receiver could get the "cyclic shift" values of P1 and P2 and then know the two uncorrelated preamble sequences, P1 and P2, used by the user's transmission. In some example embodiments, the user identifier (UE_ID) is included in the payload bits/data bits. Some bits in the UE_ID can be used to determine the "cyclic shift" values of P1 and P2. By determining the "cyclic shift" values of P1 and P2 from bits of the UE_ID or other payload bits/data bits, it is not necessary to introduce extra information indicating the uncorrelated preamble sequences in the data or payload, thereby saving overhead.

In another example, a shift register sequence generator using Method1 may be used to generate N1 preamble sequences. Another shift register sequence generator using Method2 may be used for generating N2 preamble sequences. Different sequences may be generated by using different "initial states" of a shift register sequencer. The "initial state" user to generate P1 is different from the "initial state" used to generate P2 so that P1 and P2 are independent. Some bits in the payload codeword/data bits can be used to determine the "initial states" of P1 and P2. As the payload bits/data bits are also codeword bits encoded through a Forward Error Correction (FEC) code. Once a user's payload bits/data bits are decoded correctly in the receive side, e.g. having passed the Cyclic Redundancy Check (CRC), the receiver could get the "initial states" of P1 and P2 and then know the two uncorrelated preamble sequences, P1 and P2, used by the user's transmission. In some example embodiments, the user identifier (UE_ID) is included in the payload bits/data bits. Some bits in the UE_ID can be used to determine the "initial states" of P1 and P2. By determining the "initial states" of P1 and P2 from bits of the UE_ID or other payload bits/data bits, it is not necessary to introduce extra information indicating the uncorrelated preamble sequences in the data or payload, thereby saving overhead.

Figure 7:
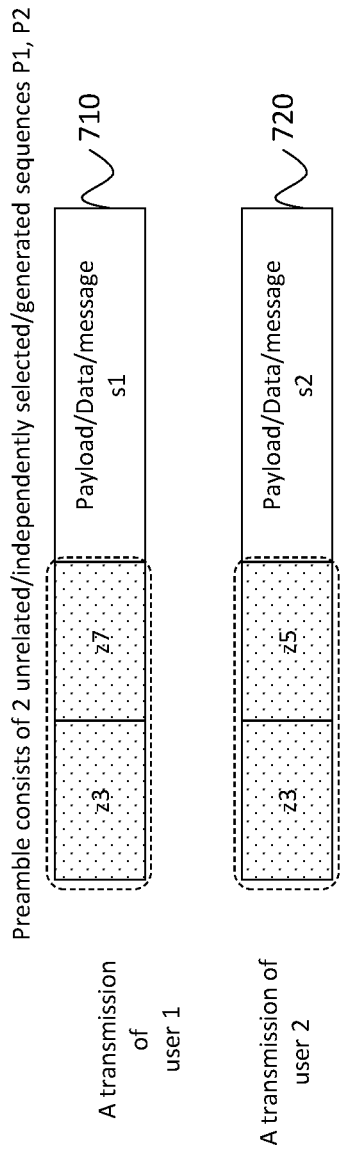
FIG. 7 depicts an example of a first data packet for a first user equipment that includes a preamble with two sequences and a second data packet for a second user equipment that includes a preamble with two sequences, in accordance with some example embodiments.

Benefits of the disclosed subject matter include reducing preamble/pilot collisions. A collision occurs when a pilot or preamble sequence are the same for more than one user equipment with single-preamble/single-pilot scheme. FIG. 7 depicts a first data packet 710 for a first user equipment that includes a preamble with two uncorrelated sequences labelled z3 and z7, and a second data packet 720 for a second user equipment that includes a preamble with two uncorrelated sequences labelled z3 and z5. The multiple unrelated/independently preamble scheme reduces the likelihood of preamble collision. As shown in FIG. 7, although the first preamble sequence selected by these two users' transmissions are both z3, that's although the first preamble sequence of these two transmissions have collided. The second preamble sequences are different because user 1 using z7 and user2 using z5 as their second preamble sequences respectively. The receiver can perform channel estimation using the second preamble sequences that do not collide, thereby enabling demodulation of the signals to separate the data of the first and second user.

Figure 8:
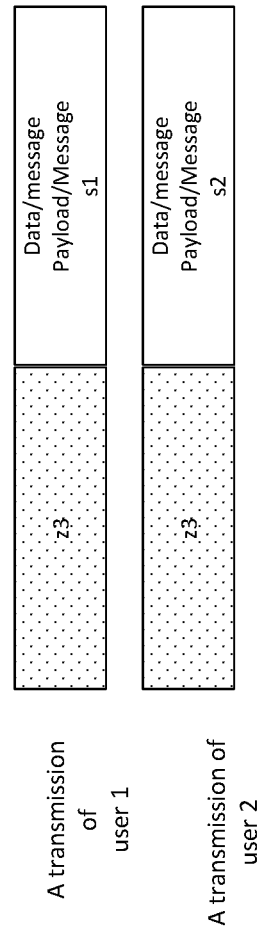
FIG. 8 depicts an example of a single-preamble scheme that includes a 64-length sequence which can have 64 orthogonal sequences, in accordance with some example embodiments.

FIG. 8 depicts a single-preamble scheme that includes a 64-length sequence which can have 64 orthogonal sequences. As such, P may be selected from a set of orthogonal sequence Z of size 64. Since each user can select one of the 64 length preamble sequences Z, two user equipment that autonomously select one of the 64 sequences have a probability of collision of 1/64.

In contrast, the FIG. 7 independent multi-preamble or uncorrelated multi-preamble scheme with the same preamble overhead as shown above with respect to FIG. 8, uses a preamble for each user equipment that includes "w" independent/uncorrelated sequences each of which is composed of "64/w" long sequences. For example, in FIG. 7 w=2, and two independent sequences of length 64/2=32 (half the size of the FIG. 8 scheme), are concatenated together where each of the two independent sequences are determined from a sequence set including 32 orthogonal sequences. Moreover, the selecting of the first sequence, P1, from the size-32 orthogonal sequence set is independent to the selecting of the second sequence, P2. The collision probability of the P1 of two users is 1/32, and the probability of collision of the P2 of two users is also 1/32. Because P1 and P2 are independent/uncorrelated, the collision of P1 and P2 are also independent/uncorrelated. Therefore, the probability of a collision of both P1 and P2 is the product of these two independent probability, e.g. Prob (collision of both P1 and P2)=(1/32)*(1/32)=1/1024, which is significantly lower than the preamble collision probability of single-preamble scheme (e.g. 1/64)

In FIG. 7, the first preamble sequence, P1, collides, but the second sequence, P2, is different. The receiver can use the second preamble sequence that does not collide for channel estimation, and then demodulate the information of user 1 and user 2.

In some example embodiments, an independent multi-preamble scheme is used as disclosed above. The collision probability of the preamble is reduced compared with the traditional preamble scheme. Because the collision probability of the traditional preamble scheme is high under high load, the reliability of the unscheduled transmission, especially the reliability of the high-load unscheduled transmission, can be improved using the disclosed multi-preamble scheme.

Although the new multiple independent preamble scheme or multiple uncorrelated preamble scheme can reduce the probability of preamble collision compared with traditional single preamble scheme, if the total energy of the w preamble uncorrelated sequences P1, P2, . . . , Pw is the same as the energy of a preamble sequence P of the single preamble scheme, then each of the sequence energies in the multiple uncorrelated preamble scheme is 1/w of the single preamble, and the performance of the channel estimation may decrease when compared with single preamble scheme. In order to maintain the energy of each preamble sequence in a w independent preamble scheme, w times of transmit energy for the preamble signal should be used.

If the total energy of the two preamble sequences P1 and P2 is the same as the energy of a single preamble sequence P, then the energy of P1 or P2 is only half of the single preamble. When the channel is estimated by using one of two preamble sequences that does not collide, the performance of the channel estimation may be reduced by 3 dB compared with the single preamble scheme.

If the preamble consists of four independent sequences, then one of the preambles may have 1/4 of the energy, so that in the worst case, the performance of channel estimation using only one of the sequences may drop by 6 dB when compared with the single preamble scheme.

In some example embodiments of the independent multi-preamble scheme, the transmit power or transmit energy of the preamble can be increased.

Receiver multi-user detection, need to use P1 and P2 for multi-user detection, double the multi-user detection than the traditional single-preamble scheme.

Figure 9:
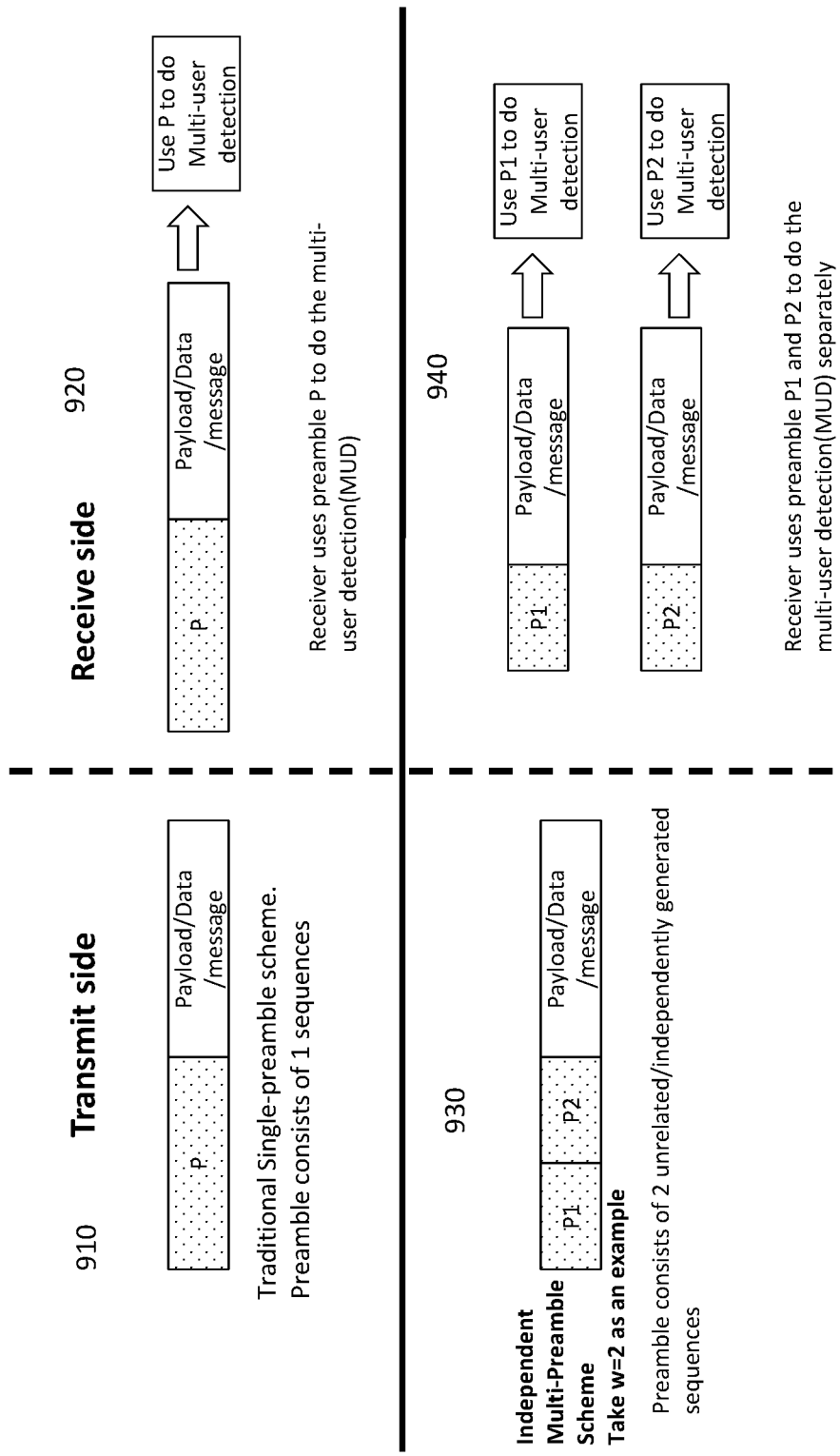
FIG. 9 depicts a diagram showing a comparison of the transmit side and the receive side for single and multi-sequence preambles, in accordance with some example embodiments.

FIG. 9 depicts a diagram showing a comparison of the transmit side and the receive side for single and multiple uncorrelated preamble scheme. At 910 is an example of a transmit side data packet with a single preamble sequence and payload. At 920 is an example of a receive side data packet received using multi-user detection with a single preamble sequence and payload. At 930 is an example of a transmit side data packet with a multi-sequence preamble and payload. At 940 is an example of a receive side data packet received using multi-user detection on the first sequence, P1, and the payload and the second sequence, P2, and the payload.

Figure 10:
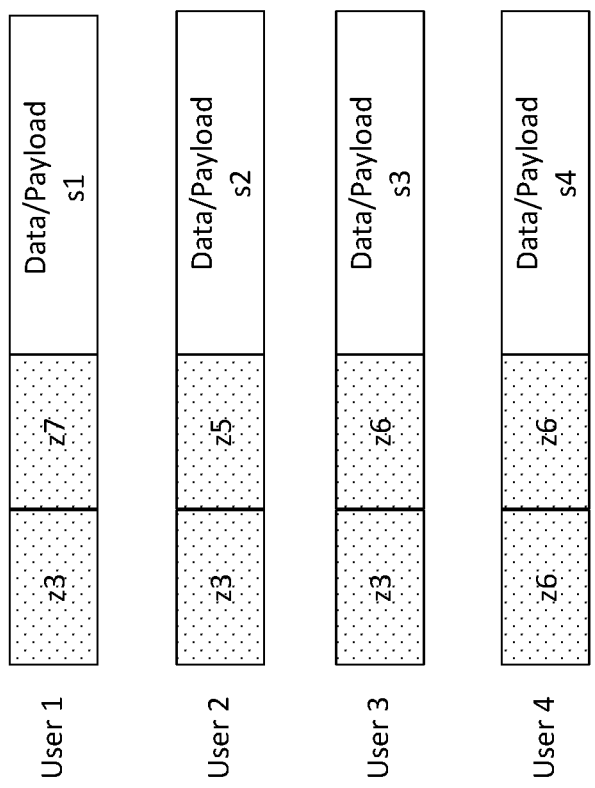
FIG. 10 depicts an example of four user equipment using independent multi-sequence preamble scheme, in accordance with some example embodiments.

FIG. 10 depicts four user equipment using multiple uncorrelated preamble scheme (also referred to as multiple uncorrelated pilot scheme). In FIG. 10, w=2. By using two unrelated/independently generated sequences as preambles, the collision probability can be reduced, but the receiver does not know which of the preamble sequences is selected by each user. Therefore, the receiver needs to use these two uncorrelated preambles to perform a multi-user detection separately, that is, two multi-user detections are needed.

In this case, the received payload/data symbol without the AWGN may be expressed as:

$$y=h1*s1+h2*s2+h3*s3+h4*s4 \quad \text{Equation 3}$$

The two preambles received without the AWGN may be expressed as:

$$P1=z3*(h1+h2+h3)+z6*h4 \quad \text{Equation 4}$$

$$P2=z5*h2+z6*(h3+h4)+z6*h1 \quad \text{Equation 5}$$

where hk is the channel gain between the transmit antenna of the k-th UE/vehicle and the receive antenna of the BS or the given vehicle, sk is the digital modulation symbol of the message of the k-th UE/vehicle, and the operator * indicates the complex multiplication.

Figure 11A:
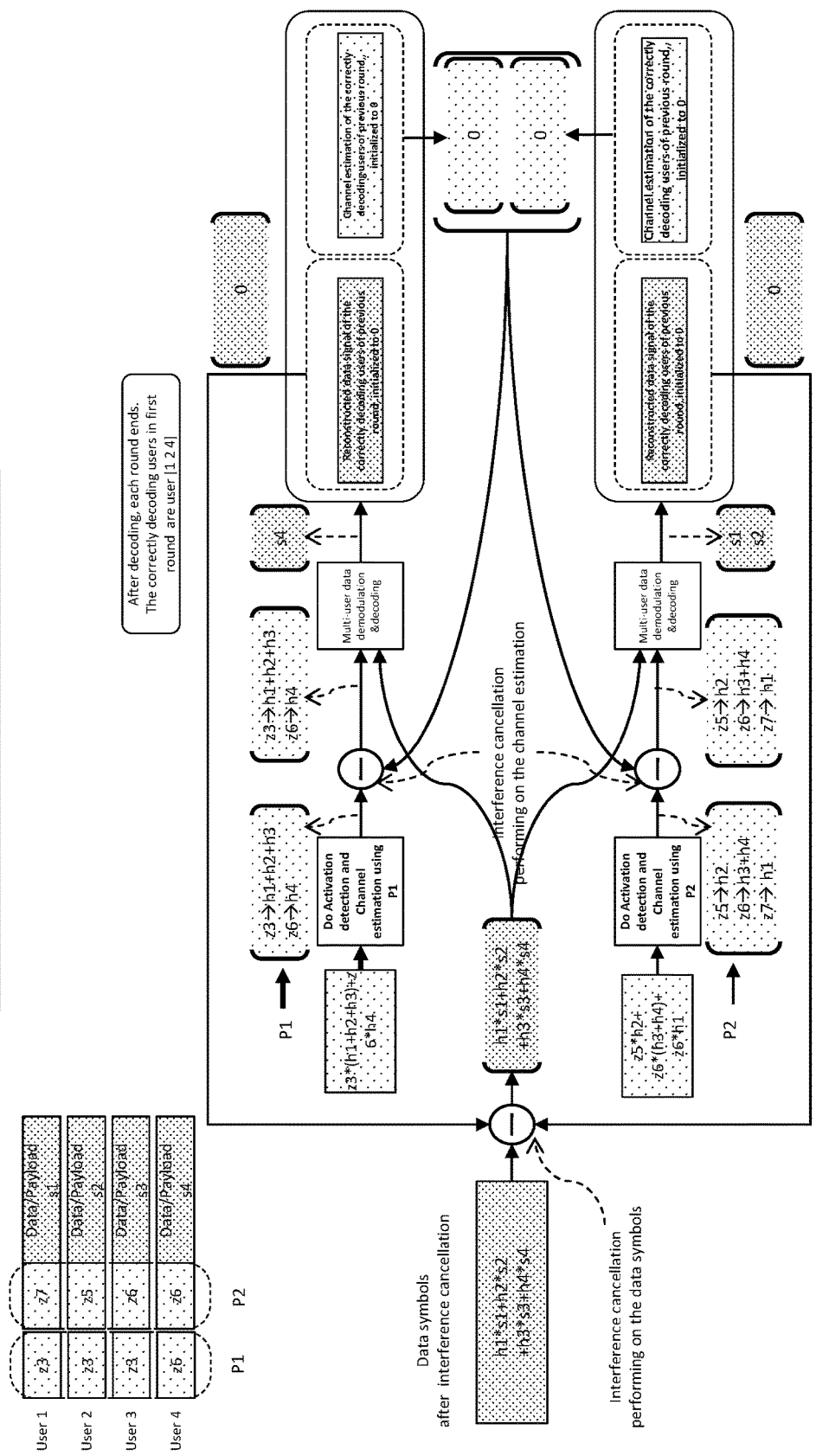
FIGS. 11A-11C depict examples of a receiver detection process, in accordance with some example embodiments.
Figure 11B:
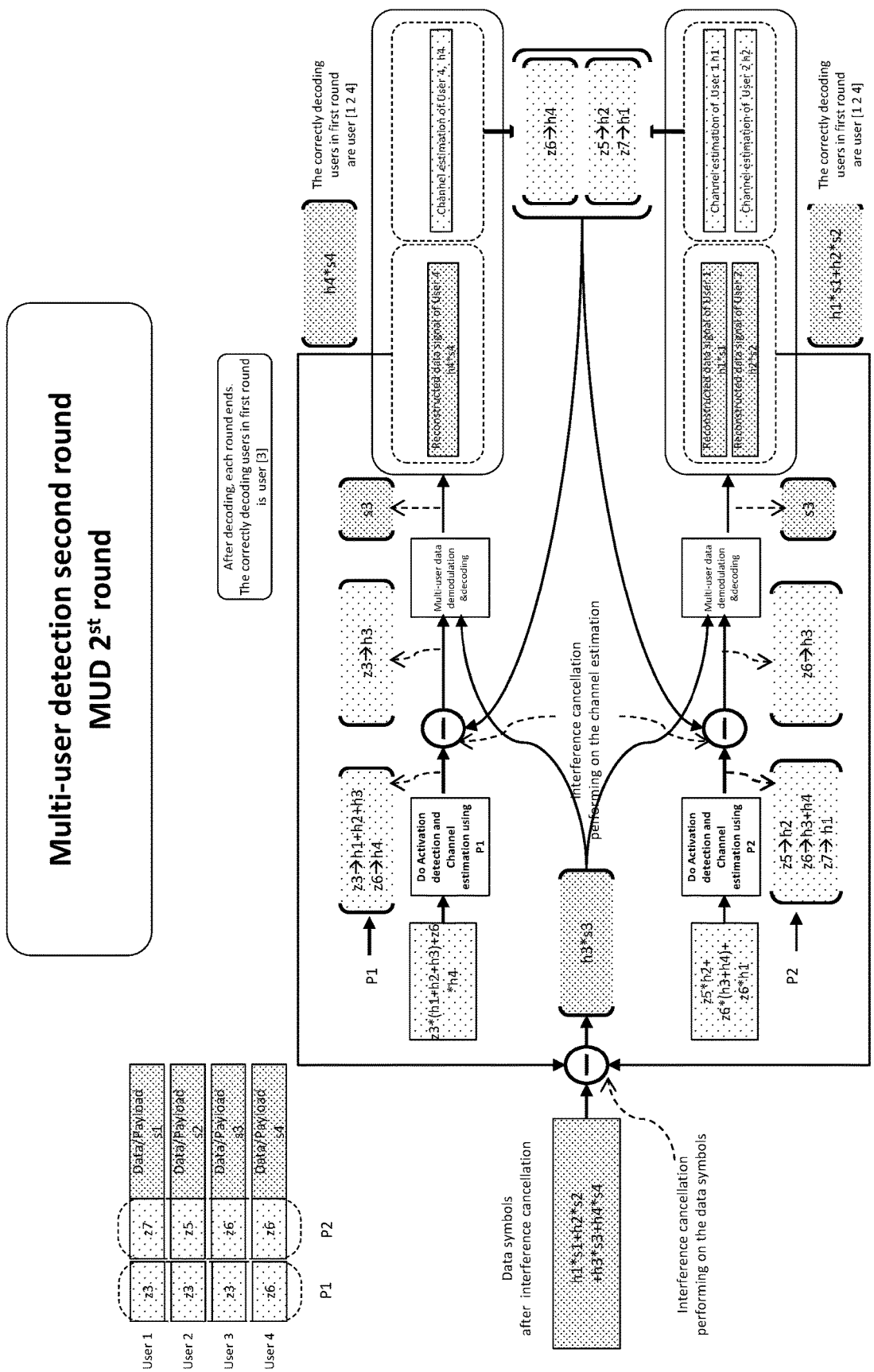
Figure 11C:
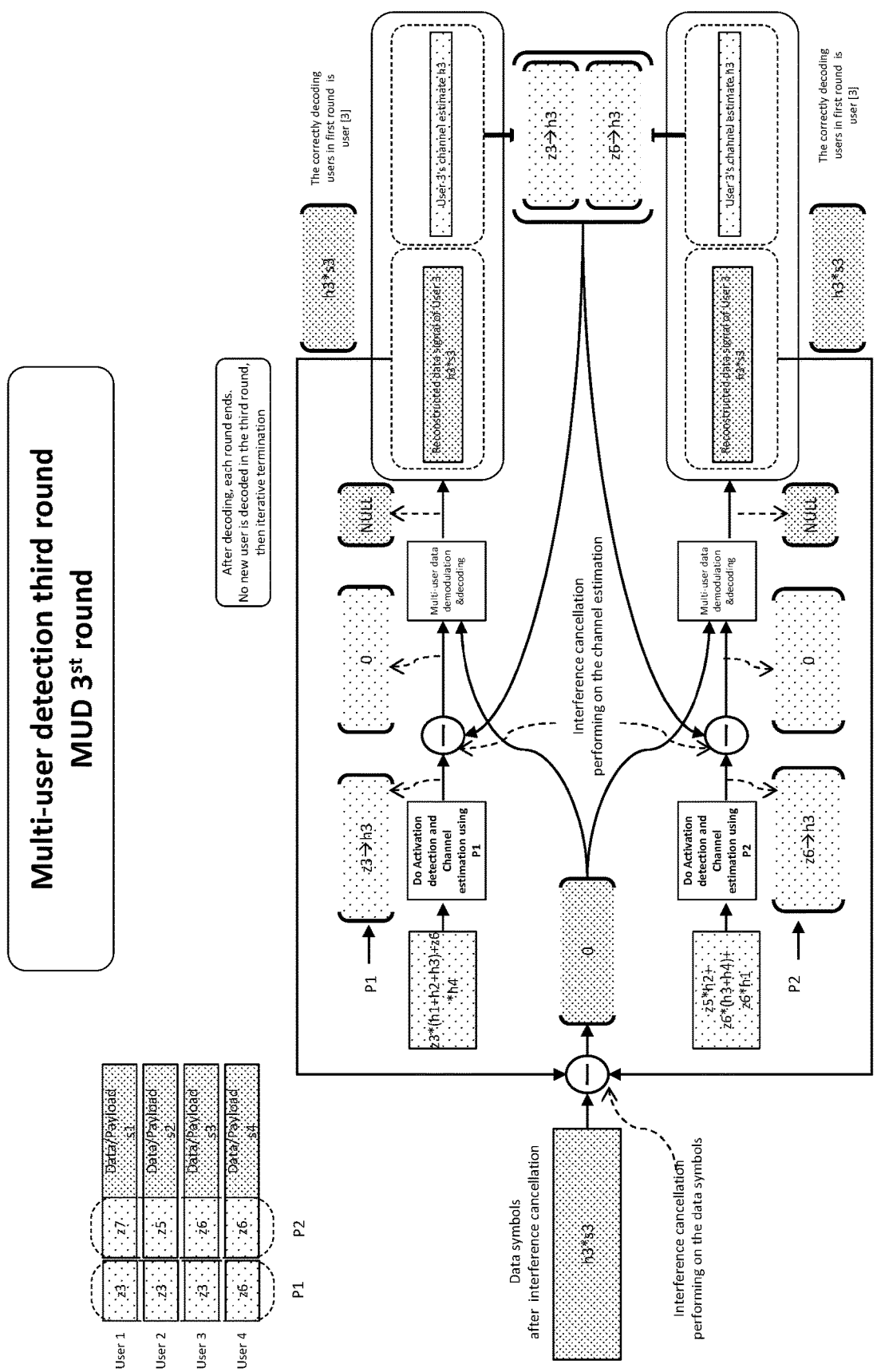

FIG. 11A depicts an example of a receiver detection process, in accordance with some example embodiments. The receiver uses the first received preamble sequence for multi-user detection as follows: 1) Correlate the first preamble sequence received and detect two example sequences [z3, z6]. 2) Then z3 and z6 are used for channel estimation. The channel estimated by z3 is h1+h2+h3, and the channel estimated by z6 is h4. This process can be abbreviated as [z3→h1+h2+h3] [z6→h4]. 3) In this example, the receiver realizes that there are two users accessing from the detection of the first received preamble sequence, so a MUD for the payload/data can be used to try to decode these two detected users' payload/data. However, in this example only the user 4's payload/data can be decoded correctly.

Similarly, the receiver uses the second received preamble sequence for multi-user detection as follows: 1) Correlate detection of the received second preamble sequence, detecting 3 sequences [z5, z6, z7]. 2) Then use [z5, z6, z7] for channel estimation, where the z5 estimated channel is h2, the z6 estimated channel is h3+h4, the z7 estimated channel is h1. The process can be abbreviated as [z5→h2] [z6→h3+h4] [z7→h1]. 3) In this example, the receiver realizes that there are 3 users accessing from the detection of the second received preamble sequence, so a MUD for the payload/data can be used to try to decode these two detected users' payload/data. However, in this example only the user 1's and the user 2's payload/data can be decoded correctly.

In the first round of multi-user detection in the foregoing example, user 1, user 2, and user 4 decoding succeeded, but the user 3 payload/data cannot be decoded. In order to further demodulate the information of user 3, the reconstructed signal of user 1, user 2, and user 4 needs to be eliminated from the received data symbol y, that is, y−h1*s1+h2*s2+h4*s4, after that, the residual data symbol is h3*s3. However, at this point, the receiver does not know the exist of user 3 and does not know the channel h3 of user 3 as well, so s3 cannot be demodulated from h3*s3.

In order to obtain the channel h3 of the user 3, the channel estimation of the user that has been decoded correctly should be subtracted from the channel estimation obtained by P1 and P2, that is, the channel estimation from the independent preambles also needs to be interference-cancelled. If the receiver knows the situation of the two independent preambles P1 and P2 of each user, it is relatively simple to perform the interference-cancellation on the channel estimation of independent preambles and therefore know h3.

In the first round of detection, the channel estimated by the receiver through the detected z3 in the first received preamble sequence is h1+h2+h3, and since the receiver has decode user 1 and user 2 in the first round of detection, and therefore knows that the first preambles of user 1 and user 2 are both z3. Then the receiver knows the channel h1 of user 1, and the channel h2 of user 2, so the receiver can subtract h1 and h2 from the estimated "sum channel", "h1+h2+h3", so that the residual channel estimate value is h3.

The base station does not know what the residual channel estimate value is at this time, that is, it even does not know that there is user 3 in the received signal after interference cancellation of first round, but the base station will use this residual value to do the second round of multi-user detection. In this example, the second round of multi-user detection can decode the payload/data of user 3, e.g. s3, from the residual data symbol, h3*s3, using the residual channel estimate value, h3.

In the above method, the receiver is required to know the situation of the two uncorrelated/independent preambles used by each user, but since the two preamble sequences are uncorrelated/independent, the receiver cannot know the situation of the other preamble sequence through one preamble sequence of one user. In order to solve, the transmitted coded payload/data can contain the information of the independent preambles transmitted together with the payload/data, so that once a user's payload/data is decoded successfully, the receiver can know the situation of the two independent preambles used by the user, and then the interference-cancellation on the channel estimation of independent preambles can be performed. In this way, the channel estimation of the collision preamble can be obtained, and the multi-user detection performance under preamble collision can be improved significantly.

In some example embodiments, P1, P2 may be randomly selected from a preamble pool. For example, P1 and P2 may be selected from a pool containing N pilots. For example, P1 selects the kth and P2 selects the jth. The two selections are unrelated and independent. This can reduce the probability of pilot collision for different users, because even the first pilot of two users may choose the same, but the second pilot may be different, so that the receiver can use the second pilot to detect multiple users.

There may be some changes, for example, two pilots are selected from two pools unrelated/independently. That is P1 is selected from a pool pool_1 containing N1 pilots, and P2 is from one containing N2 pilots. Selection of P1 and P2 are unrelated/independently.

In some embodiments, in the transmitter side, an additional partial scrambling process is applied, wherein the bits of the payload are generated using a partial scrambling technique, wherein bits of the payload before a partial scrambling are divided into two parts, then a first part of bits do not change and a second part of bits are scrambled by a scrambling sequence determined by the first part of bits.

Figure 12A:
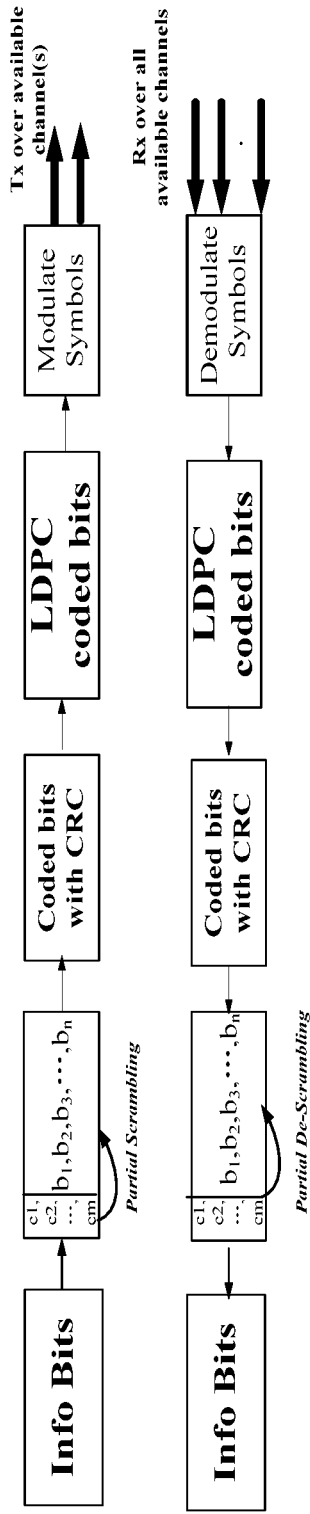
FIGS. 12A and 12B show an example of a partial scrambling technique applied to the transmission side of the uncorrelated multi-pilot/RS scheme.
Figure 12B:
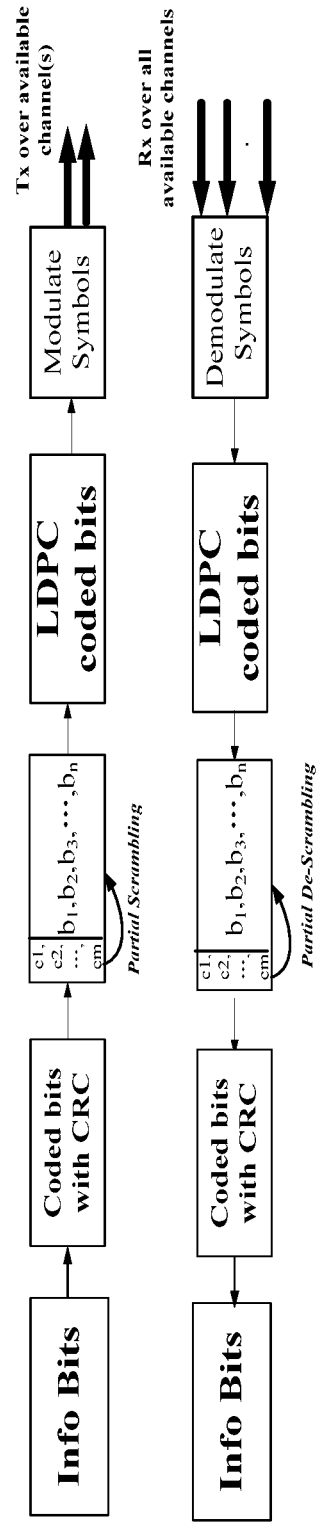

FIG. 12A and FIG. 12B show a partial scrambling technique applied to the transmission side of the uncorrelated multi-pilot/RS scheme. The scrambling operations are applied to the bits before and after CRC coding operations. The scrambling sequence is determined from a certain part of bits in the message payload whose information (e.g. the bit index within the information bits) is known to the BS. The scrambling sequence generation methodology is also known to the BS. The part of bits generating the scrambling sequence may be the plate information (e.g., license plate information) if the information is included in the payload message. When the payload is successfully decoded, the scrambling sequences may be re-generated based on the decoded bits and the sequence generation methodology. With the scrambling operations, the multi-user interference as well as the self-interference can be randomized. Considering the cases where the transmit bits are similar across different vehicles, the channel estimation based on the scrambled bits may lead to increased channel estimation accuracy and thereby better interference cancellation and decoding performance for the remaining UEs. The conventional scrambling operations are based on the scrambler generation bits are identifiers known the both the transmit and receive side prior to payload transmission. However, in the uncorrelated multi-pilot/RS scheme, the communications are more likely to happen with no central control unit and the identifiers are not known to both Tx and Rx sides. The partial scrambling technology suits better uncorrelated multi-pilot/RS scheme.

Independent multi-pilot transmission can be combined with partial scrambling. Partial scrambling, as shown in FIGS. 12A-12B, can improve the randomness of scheduling users to transmit different user data, and thus improve demodulation performance and improve the channel estimating performance by using the successfully decoded user data, the so-called data-pilot technique.

Figure 13:
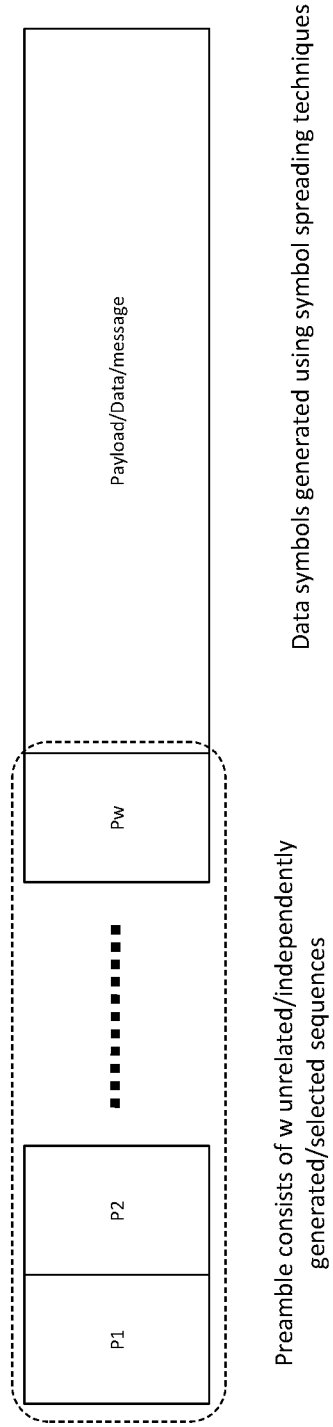
FIG. 13 depicts independent multi-pilot transmission combined with symbol extension, in accordance with some example embodiments.

Independent multi-pilot transmission can be combined with symbol spreading as shown in FIG. 13. That is, the data symbols transmitted with the Independent Multi-pilot are generated using the symbol spreading technique, and the data also contains information of the spreading sequence.

Communication may often require some level of synchronization, such as frequency synchronization, frame synchronization, symbol synchronization, etc., to ensure the performance and ease the demodulation.

The inter-vehicle direct communication seeks the advantage of bypassing the base station, which introduces a difficulty of inter-vehicle synchronization. A common synchronization source can be used to ease the inter-vehicle synchronization. That is each vehicle can synchronize to the common synchronization source before its transmission.

Multi-path wireless channel and residual timing synchronization error can make the detection or equalization of grant-free transmission difficult. In order to ease the detection or equalization operation, Orthogonal Frequency Division Multiplexing (OFDM) or Discrete Fourier Transform Spread OFDM (DFT-S-OFDM) with a long enough cyclic prefix (CP) can be used to generate the transmit waveform. A long enough CP can include CP longer than the sum of delay spread of the multi-path wireless channel and any residual timing synchronization error.

In some example embodiments, to achieve reliable grant-free transmission, the data symbols may be transmitted with the independent multi-pilot are BPSK, or $\pi/2$-BPSK, or QPSK modulation symbols.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
generating, at a first radio terminal, a signal comprising a pilot signal, wherein the pilot signal includes W pilot sequences, wherein W is an integer, and wherein the W pilot sequences are uncorrelated,
wherein the signal further comprises a payload,
wherein the W pilot sequences are determined from a portion of the payload, and
wherein the W pilot sequences are determined by a quantity of bits of the payload; and
transmitting, from the first radio terminal to a second radio terminal, the signal.

2. The wireless communication method of claim 1, wherein the W pilot sequences are selected or determined independently from two or more different predetermined pools of pilot sequences.

3. The wireless communication method of claim 2, wherein the two or more different predetermined pools of pilot sequences include two or more of:
a physical random access channel (PRACH) preamble sequence pool of a long-term evolution (LTE) standard,
another PRACH preamble sequence pool of a new radio (NR) standard,
a demodulation reference signal (DMRS) sequence pool of the LTE standard,
another DMRS sequence pool of the NR standard,
a DMRS port pool of the LTE standard, or
another DMRS port pool of the NR standard.

4. The wireless communication method of claim 1, wherein the W pilot sequences are uncorrelated DMRS sequences or uncorrelated DMRS ports.

5. The wireless communication method of claim 1, wherein the W pilot sequences are uncorrelated Zadoff-Chu sequences, and wherein the W uncorrelated Zadoff-Chu sequences have uncorrelated cyclic shift values.

6. The wireless communication method of claim 1, wherein the W pilot sequences are uncorrelated maximum length shift register (MLSR) sequences, and wherein the uncorrelated maximum length shift register (MLSR) sequences are W MLSR sequences determined by W uncorrelated initial states.

7. The wireless communication method of claim 1, wherein the quantity of bits is equal to W times M, wherein M is an integer, and wherein 2M is a cardinality of a predetermined pool of pilot sequences.

8. The wireless communication method of claim 1, wherein the payload contains an identification of the first radio terminal, and the W pilot sequences are determined from at least a portion of the identification of the first radio terminal.

9. The wireless communication method of claim 1, wherein bits of the payload are generated using a partial scrambling technique, wherein bits of the payload before a partial scrambling are divided into two parts, then a first part of bits do not change and a second part of bits are scrambled by a scrambling sequence determined by the first part of bits.

10. A wireless communication method, comprising:
receiving, at a second radio terminal from a first radio terminal, a signal including a plurality of pilot signals and payload information; and
detecting, at the second radio terminal, the signal including the plurality of pilot signals, wherein the plurality of pilot signals includes W pilot sequences, wherein W is an integer, and wherein the W pilot sequences are uncorrelated,
wherein the W pilot sequences are based on a portion of the payload information and a quantity of bits of the payload.

11. The wireless communication method of claim 10, wherein the W pilot sequences are selected or determined independently from two or more different predetermined pools of pilot sequences.

12. The wireless communication method of claim 11, wherein the two or more different predetermined pools of pilot sequences include two or more of:
a physical random access channel (PRACH) preamble sequence pool of a long-term evolution (LTE) standard,
another PRACH preamble sequence pool of a new radio (NR) standard,
a demodulation reference signal (DMRS) sequence pool of the LTE standard,
another DMRS sequence pool of the NR standard,
a DMRS port pool of the LTE standard, or
another DMRS port pool of the NR standard.

13. An apparatus comprising a processor and a memory, the processor configured to implement a method, comprising:
generate, at a first radio terminal, a signal comprising a pilot signal, wherein the pilot signal includes W pilot sequences, wherein W is an integer, and wherein the W pilot sequences are uncorrelated,
wherein the signal further comprises a payload,
wherein the W pilot sequences are determined from a portion of the payload, and
wherein the W pilot sequences are determined by a quantity of bits of the payload; and
transmit, from the first radio terminal to a second radio terminal, the signal.

14. The apparatus of claim 13, wherein the W pilot sequences are selected or determined independently from two or more different predetermined pools of pilot sequences.

15. The apparatus of claim 13, wherein the quantity of bits is equal to W times M, wherein M is an integer, and wherein 2M is a cardinality of a predetermined pool of pilot sequences.

16. The apparatus of claim 13, wherein the payload contains an identification of the first radio terminal, and the W pilot sequences are determined from at least a portion of the identification of the first radio terminal.

17. The apparatus of claim 13, wherein bits of the payload are generated using a partial scrambling technique, wherein bits of the payload before a partial scrambling are divided into two parts, then a first part of bits do not change and a second part of bits are scrambled by a scrambling sequence determined by the first part of bits.

18. An apparatus comprising a processor and a memory, the processor configured to implement a method, comprising:
receiving, at a second radio terminal from a first radio terminal, a signal including a plurality of pilot signals and payload information; and detecting, at the second radio terminal, the signal including the plurality of pilot signals, wherein the plurality of pilot signals includes W pilot sequences, wherein W is an integer, and wherein the W pilot sequences are uncorrelated,
   wherein the W pilot sequences are based on a portion of the payload information and a quantity of bits of the payload.

19. The apparatus of claim 18, wherein the W pilot sequences are selected or determined independently from two or more different predetermined pools of pilot sequences.

20. The apparatus of claim 19, wherein the two or more different predetermined pools of pilot sequences include two or more of:
   a physical random access channel (PRACH) preamble sequence pool of a long-term evolution (LTE) standard,
   another PRACH preamble sequence pool of a new radio (NR) standard,
   a demodulation reference signal (DMRS) sequence pool of the LTE standard,
   another DMRS sequence pool of the NR standard,
   a DMRS port pool of the LTE standard, or
   another DMRS port pool of the NR standard.

* * * * *